US 8,850,570 B1

(12) United States Patent
Ramzan

(10) Patent No.: US 8,850,570 B1
(45) Date of Patent: Sep. 30, 2014

(54) FILTER-BASED IDENTIFICATION OF MALICIOUS WEBSITES

(75) Inventor: Zulfikar Ramzan, Cupertino, CA (US)

(73) Assignee: Symantec Corporation, Mountain View, CA (US)

( * ) Notice: Subject to any disclaimer, the term of this patent is extended or adjusted under 35 U.S.C. 154(b) by 731 days.

(21) Appl. No.: 12/165,467

(22) Filed: Jun. 30, 2008

(51) Int. Cl.
*G06F 11/00* (2006.01)
*G06F 12/14* (2006.01)
*G06F 12/16* (2006.01)
*G08B 23/00* (2006.01)
*G06F 1/00* (2006.01)

(52) U.S. Cl.
CPC ........................................ *G06F 1/00* (2013.01)
USPC ................... 726/22; 726/24; 726/26; 726/27; 709/223; 713/187; 713/188

(58) Field of Classification Search
CPC ....................................................... G06F 11/00
USPC .............................................. 726/22; 707/10
See application file for complete search history.

(56) References Cited

U.S. PATENT DOCUMENTS

| | | | |
|---|---|---|---|
| 7,836,502 B1 * | 11/2010 | Zhao et al. | 726/22 |
| 7,873,635 B2 * | 1/2011 | Wang et al. | 707/735 |
| 7,873,656 B1 * | 1/2011 | Soubramanien | 707/770 |
| 7,974,998 B1 * | 7/2011 | Chang | 709/201 |
| 8,312,536 B2 * | 11/2012 | Nachenberg et al. | 726/22 |
| 2008/0034073 A1 * | 2/2008 | McCloy et al. | 709/223 |
| 2008/0133540 A1 * | 6/2008 | Hubbard et al. | 707/10 |

* cited by examiner

*Primary Examiner* — Arvin Eskandarnia
(74) *Attorney, Agent, or Firm* — Fenwick & West LLP

(57) ABSTRACT

A candidate suspicious website is identified. A plurality of lightweight features associated with the candidate suspicious website is identified. A filter score is determined based on the plurality of lightweight features, wherein the filter score indicates a likelihood that the candidate suspicious website is a malicious website. Whether the filter score exceeds a threshold is determined. Responsive at least in part to the filter score exceeding the threshold it is determined that the candidate suspicious website is a suspicious website. Whether the suspicious website is a malicious website is determined by identifying software downloaded to the computing system responsive to accessing the suspicious website and determining whether the software downloaded to the computing system is malware based on characteristics associated with the downloaded software.

16 Claims, 6 Drawing Sheets

FILTER-BASED IDENTIFICATION OF MALICIOUS WEBSITES

BACKGROUND OF THE INVENTION

1. Field of the Invention

This invention pertains in general to computer security and in particular to the identification of websites that host or disseminate malicious software (malware).

2. Description of the Related Art

There is a wide variety of malicious software (malware) that can attack modern computers. Malware threats include computer viruses, worms, Trojan horse programs, spyware, adware, crimeware, and phishing websites. Modern malware is often designed to provide financial gain to the attacker. For example, malware can surreptitiously capture important information such as logins, passwords, bank account identifiers, and credit card numbers. Similarly, the malware can provide hidden interfaces that allow the attacker to access and control the compromised computer.

One method by which malware can attack a computer is through a user's access of a website that hosts or disseminates malicious code ("malicious websites"). The identification of a set of known malicious websites enables users of client computer systems running security software to receive alerts and notifications which enable the users to assess the risk of and/or block access to the malicious websites.

Due to code obfuscation and other techniques employed by malicious websites to evade detection, it is often necessary to access the website in order to determine whether the website hosts or disseminates malicious software. Once the website has been accessed, techniques may be employed to identify commands and transactions on a computer system accessing the website that indicate malicious behavior. Although these techniques are reliable for identifying malicious websites, they require significant computational resources. Due to the massive number of websites a user can potentially visit, these techniques are not for scalable for identifying a comprehensive set of known malicious websites for use in security software.

Accordingly, there is a need in the art for scalable methods of identifying malicious websites.

BRIEF SUMMARY

The above and other needs are met by methods and computer-readable storage media for identifying malicious websites.

One aspect provides a method of identifying malicious websites. A candidate suspicious website is identified. A plurality of lightweight features associated with the candidate suspicious website is identified. A filter score is determined based on the plurality of lightweight features, wherein the filter score indicates a likelihood that the candidate suspicious website is a malicious website. Whether the candidate suspicious website is a malicious website is determined responsive at least in part to the filter score.

Another aspect provides a computer system for identifying malicious websites. The system comprises a web crawler module adapted to identify a candidate suspicious website and identify a plurality of lightweight features associated with the candidate suspicious website. The system further comprises a filter module adapted to determine a filter score based on the plurality of lightweight features, wherein the filter score indicates a likelihood that the candidate suspicious website is a malicious website. The filter module is further adapted to determine whether the candidate suspicious website is a malicious website responsive at least in part to the filter score.

In another aspect the described embodiments provide a computer-readable storage medium encoded with computer program code for identifying malicious websites according to the method described above.

The features and advantages described in this summary and the following detailed description are not all-inclusive. Many additional features and advantages will be apparent to one of ordinary skill in the art in view of the drawings, specification, and claims hereof.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
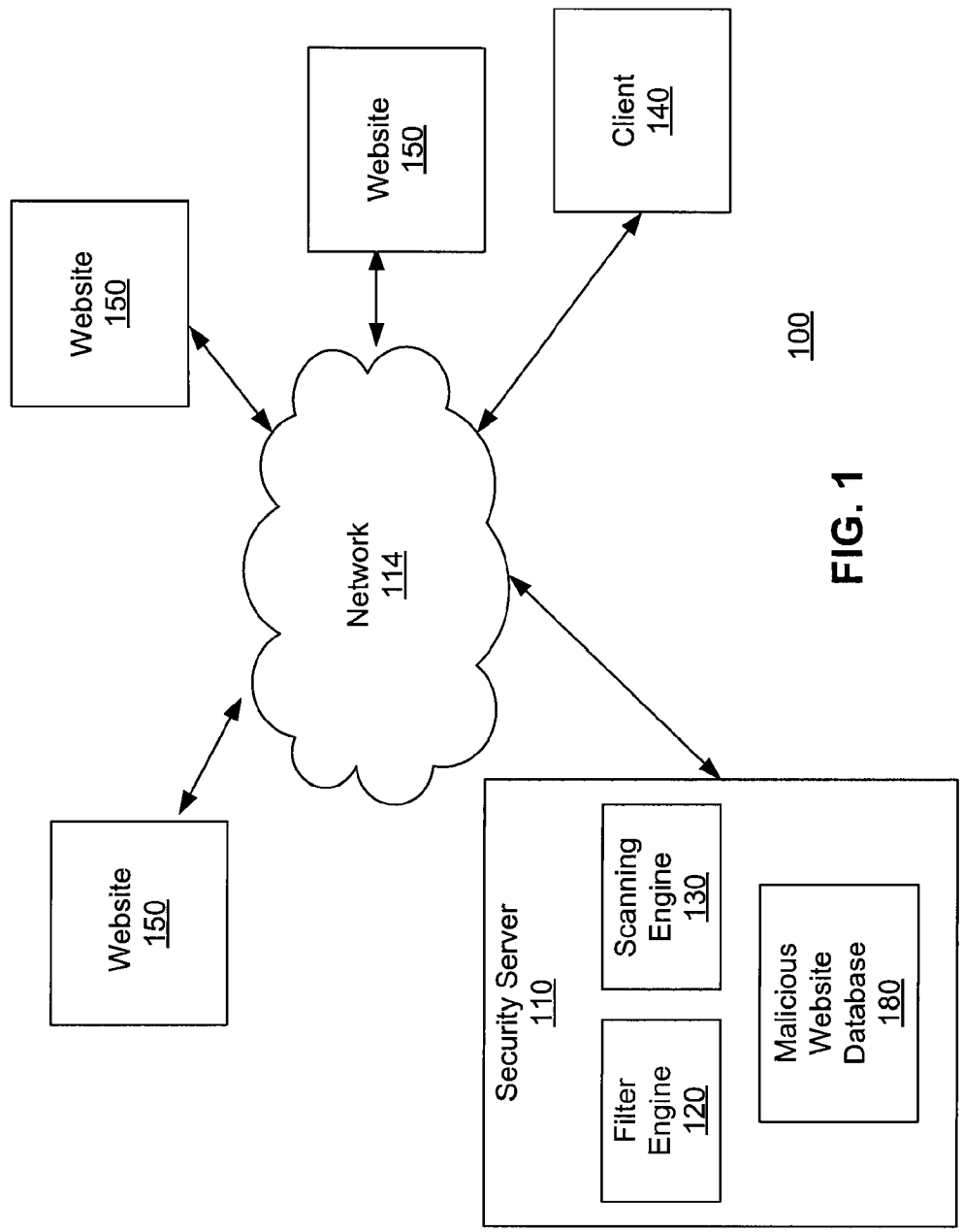
FIG. 1 is a high-level block diagram of a computing environment 100 according to one embodiment.

FIG. 1 is a high-level block diagram of a computing environment 100 according to one embodiment. FIG. 1 illustrates a security server 110, a client 140 and plurality of websites 150 connected by a network 114. Only three websites 150 and one client 140 are shown in FIG. 1 in order to simplify and clarify the description. Embodiments of the computing environment 100 can have thousands or millions of websites 150 and clients 140 connected to the network 114.

The security server 110 interacts with the websites 150 via the network 114. The security server 110 includes a filter engine 120 which accesses the websites 150 through the network 114 in order to identify candidate suspicious websites based on a set of defined heuristics. The filter engine 120 further identifies information associated with the candidate suspicious websites including hypertext transfer protocol (HTTP) traffic information.

The filter engine 120 applies a filter classifier to lightweight features extracted from the information associated with the candidate suspicious website in order to generate a filter score. The filter score indicates whether the lightweight features extracted from the candidate suspicious website have a high correlation to lightweight features associated with malicious websites. Lightweight features are features that do not require extensive processing to extract from websites or information associated with the websites. The filter classifier is a statistical model which is generated based on lightweight features extracted from information associated with a set of known malicious websites and information associated with a set of websites that are known not to be malicious ("innocuous websites").

The filter engine 120 uses the filter score to determine whether the candidate suspicious website requires further processing to determine whether it is a malicious website (i.e. is a suspicious website). If the filter score exceeds a threshold value, the candidate is determined to be a suspicious website and is subject to further analysis. If the filter score is beneath a threshold value, the candidate suspicious website is determined to be innocuous and is not subject to further analysis. This filter score is also used to prioritize analysis of the suspicious website.

The security server 110 further includes a scanning engine 130 which determines whether suspicious websites are malicious websites. The scanning engine 130 prioritizes analysis of the suspicious websites based on the filter scores. The scanning engine 130 further performs computationally intensive scanning on the suspicious websites to generate malicious website scores. The malicious website scores indicate whether the suspicious websites are malicious websites. The scanning engine 130 stores unique identifiers for the suspicious websites and their malicious website scores in the malicious website database 180.

The security server 110 transmits the malicious website database 180 to one or more clients 140 running security software provided by the security server 110. Upon identification of an attempt to access a website that is indicated to be malicious in the malicious website database 180, the client 140 can suppress or block the access of the malicious website and/or notify the user of the risk of malware infection associated with accessing the malicious website.

In one embodiment, a client 140 is a computer used by one or more users to perform activities including downloading, installing, and/or executing software entities. The client 140, for example, can be a personal computer executing a web browser such as MICROSOFT INTERNET EXPLORER that allows the user to retrieve and display content from websites 150 and other computers on the network 114. In other embodiments, the client 140 is a network-capable device other than a computer, such as a personal digital assistant (PDA), a mobile telephone, a pager, a television "set-top box," etc. For purposes of this description, the term "client" also includes computers such as servers and gateways that encounter software entities or other entities that might constitute malware or other threats. For example, a client 140 can be a network gateway located between an enterprise network and the Internet.

Using heuristics to identify candidate suspicious websites enables the selection of a scalable subset of all websites for further analyses. Likewise, the extraction of lightweight features from the candidate suspicious websites and filter classification of the candidate suspicious websites based on the lightweight features enables targeted scanning of suspicious websites. This approach leverages easily processed and identified information such as heuristics and lightweight features to identify a set of suspicious websites upon which to perform computationally-intensive scanning techniques. By leveraging these approaches, an overall rate of false positive and false negative identification of malicious websites is reduced without creating excess computational burden.

The network 114 represents the communication pathways between the websites 150, security server 110 and clients 140. In one embodiment, the network 114 is the Internet. The network 114 can also utilize dedicated or private communications links that are not necessarily part of the Internet. In one embodiment, the network 114 uses standard communications technologies and/or protocols. Thus, the network 114 can include links using technologies such as Ethernet, 802.11, integrated services digital network (ISDN), digital subscriber line (DSL), asynchronous transfer mode (ATM), etc. Similarly, the networking protocols used on the network 114 can include the transmission control protocol/Internet protocol (TCP/IP), the hypertext transport protocol (HTTP), the simple mail transfer protocol (SMTP), the file transfer protocol (FTP), etc. The data exchanged over the network 114 can be represented using technologies and/or formats including the hypertext markup language (HTML), the extensible markup language (XML), etc. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

Figure 2:
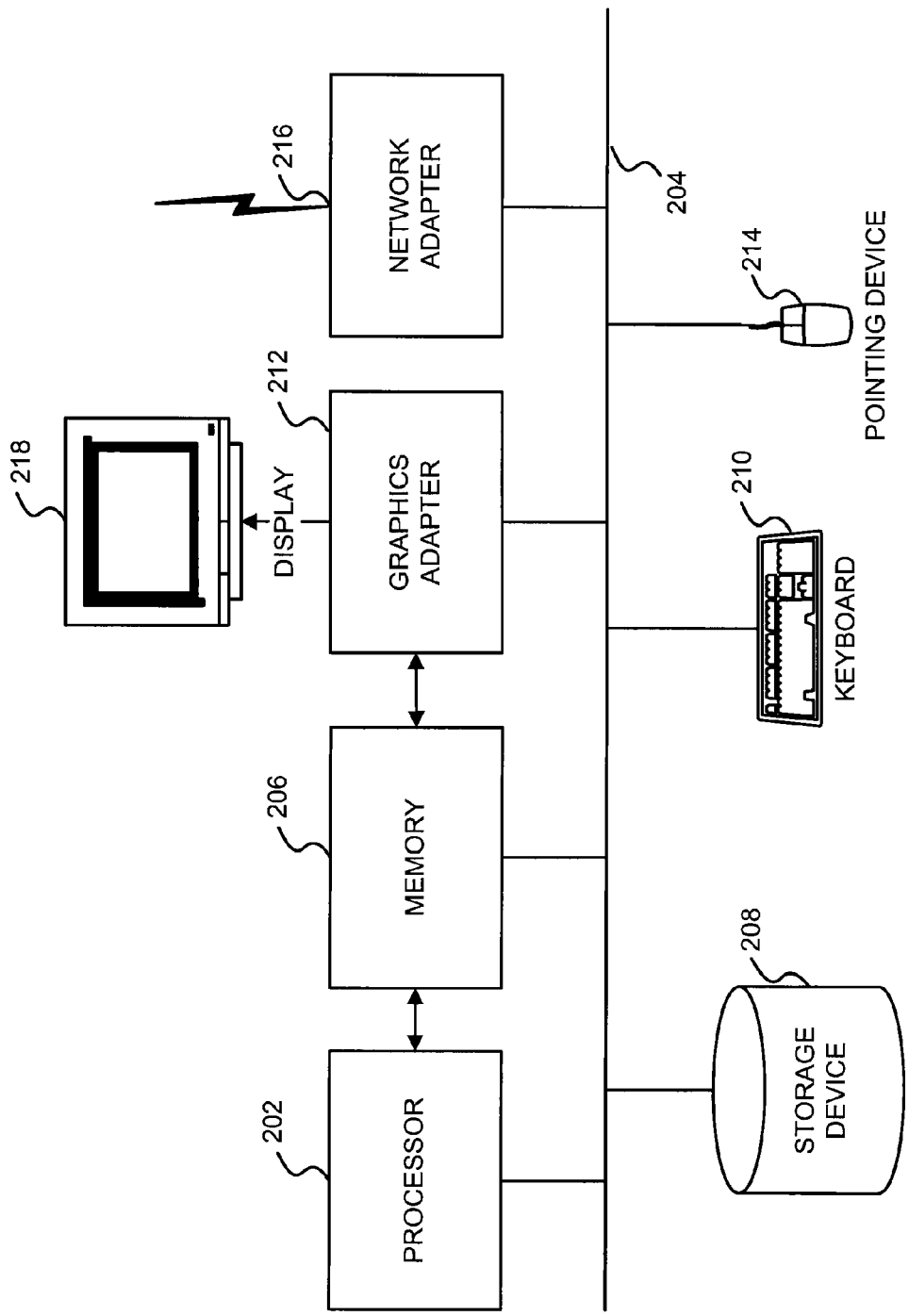
FIG. 2 is a high-level block diagram illustrating a typical computer 200 for use as a security server 110, website 150 or client 140 according to one embodiment.

FIG. 2 is a high-level block diagram illustrating a typical computer 200 for use as a security server 110 (FIG. 1) or client 140 (FIG. 1) according to one embodiment. Illustrated are a processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The processor 202 may be any general-purpose processor such as an INTEL x86 compatible-CPU. The storage device 208 is, in one embodiment, a hard disk drive but can also be any other device capable of storing data, such as a writeable compact disk (CD) or DVD, or a solid-state memory device. The memory 206 may be, for example, firmware, read-only memory (ROM), non-volatile random access memory (NVRAM), and/or RAM, and holds instructions and data used by the processor 202. The pointing device 214 may be a mouse, track ball, or other type of pointing device, and is used in combination with the keyboard 210 to input data into the computer 200. The graphics adapter 212 displays images and other information on the display 218. The network adapter 216 couples the computer 200 to the network 114.

As is known in the art, the computer 200 is adapted to execute computer program modules. As used herein, the term "module" refers to computer program logic and/or data for providing the specified functionality. A module can be implemented in hardware, firmware, and/or software. In one embodiment, the modules are stored on the storage device 208, loaded into the memory 206, and executed by the processor 202.

The types of computers 200 utilized by the entities of FIG. 1 can vary depending upon the embodiment and the processing power utilized by the entity. For example, a client 140 that is a mobile telephone typically has limited processing power, a small display 218, and might lack a pointing device 214. The security server 110, in contrast, may comprise multiple blade servers working together to provide the functionality described herein.

Figure 3:
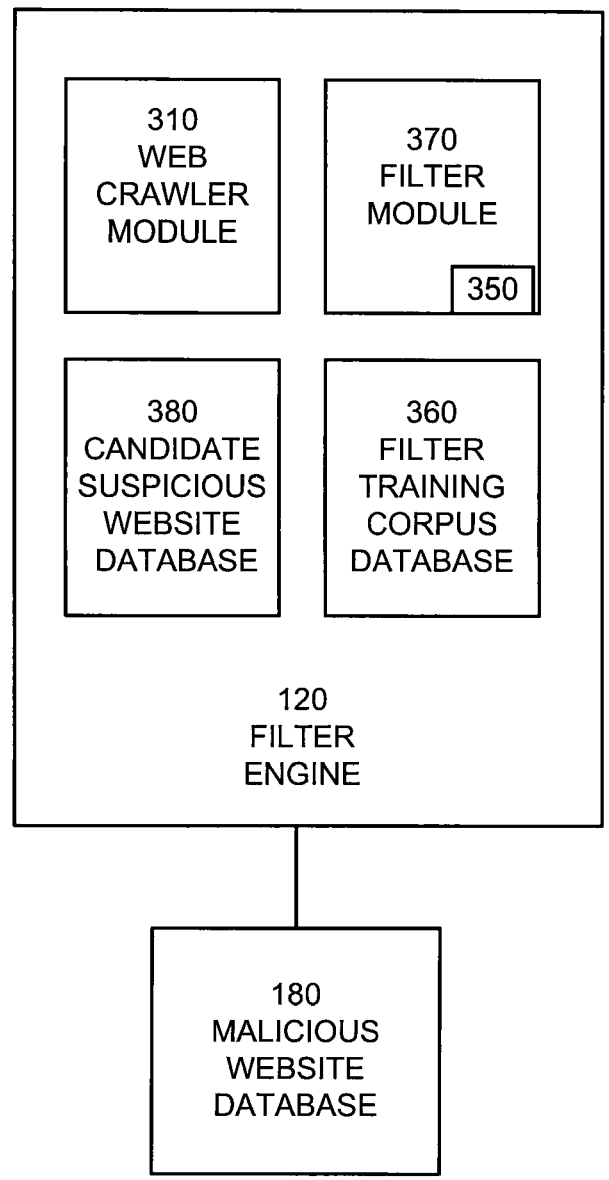
FIG. 3 is a high-level block diagram illustrating a detailed view of the filter engine 120 according to one embodiment.

FIG. 3 is a high-level block diagram illustrating a detailed view of the filter engine 120 (FIG. 1) according to one embodiment. As shown in FIG. 3, the filter engine 120 includes several modules. Those of skill in the art will recognize that other embodiments can have different and/or other modules than the ones described here, and that the functionalities can be distributed among the modules in a different manner. In addition, the functions ascribed to the filter engine 120 can be performed by multiple servers.

A web crawler module 310 identifies and examines candidate suspicious websites 150 (FIG. 1) on the network 114

(FIG. 1) according to defined heuristics. In one embodiment, a set of seed links are used as heuristics to identify and examine the candidate suspicious websites. These seed links can include, for example, links to websites found in spam emails, links reported from third party sources such as clients or security servers, newly registered links, links found in malicious software, links found by traversing search engine results obtained from suspicious queries (e.g. links found by traversing search engine results obtained from the query "free screensavers"), etc. The web crawler module 310 receives the set of seed links to websites on the network 114 and analyzes the links to identify links to candidate suspicious websites. For example, a link in the set of seed links that is referenced in a spam email is likely to be identified as a link to a candidate suspicious website.

Upon identification of a link to a candidate suspicious website, the web crawler module 310 identifies information associated with the candidate suspicious website. In one embodiment, the information associated with the candidate suspicious website includes HTTP traffic information. In one embodiment, the information associated with the candidate suspicious website includes the internet protocol (IP) address of the web server hosting the candidate suspicious website. In some embodiments, the web crawler module 310 extracts a set of lightweight features from the HTTP information and other information associated with the candidate suspicious website and stores these features in the candidate suspicious website database 380 along with the website's associated uniform resource locator (URL) or other unique identifier.

According to one embodiment, the lightweight features extracted by the web crawler module 310 and stored in the candidate suspicious website database 380 include:

1) Information indicating the web server software of the candidate suspicious website as defined in tokens in the HTTP traffic information associated with the website.
2) Information indicating a location where the candidate suspicious website is hosted as defined in the URL for the candidate suspicious website or as defined by the IP address of the web server hosting the candidate suspicious website.
3) Information indicating an autonomous system associated with the candidate suspicious website. The autonomous system is inferred from the IP address of the web server hosting the candidate suspicious website.
4) Information indicating whether the candidate suspicious website contains references to advertising networks in the HTTP traffic information associated with the website.
5) Information indicating whether the candidate suspicious website contains references to public file hosting systems in the HTTP traffic information associated with the website.
6) Information indicating the IP address of the web server hosting the candidate suspicious website or a range including the IP address of the web server hosting the candidate suspicious website.
7) Information indicating whether the candidate suspicious website is within a categorized directory of reviewed websites such as DMOZ (the open directory project) and a category of the candidate suspicious website within the categorized directory of reviewed websites.
8) Information indicating the number of redirections or links to other websites in the candidate suspicious website.
9) Information indicating general domain-based reputation metrics associated with the domain of the candidate suspicious website such as the length of uptime of the domain and the use of an IP addresses in place of an URL associated with the domain.
10) Information indicating the source for the heuristic used to identify the candidate suspicious website and past characteristics of the heuristic. For example, the number of different heuristics referencing the candidate suspicious website or a value indicating a trust in a source of heuristics used to identify the candidate suspicious website.
11) Information indicating traditional characteristics of malware websites. For example, information indicating the presence of a small inline frame (IFRAME) or other element used to embed documents such as HTML documents inside other documents.

The filter training corpus database 360 stores information associated with known malicious and innocuous websites in association with unique identifiers for the malicious and innocuous websites. The set of known malicious and innocuous websites may be determined by an administrator of the security server 110 or may correspond in part to the malicious website database 180. The set of known malicious and innocuous websites in the filter training corpus database 360 may be updated periodically or continuously to include information associated with newly identified malicious websites in the malicious website database 180. The filter training corpus database 360 stores information regarding the HTTP traffic associated with the known malicious and innocuous websites. The filter training corpus database 360 further stores a dataset of lightweight features extracted from the information associated with the known malware and innocuous databases as described above in reference to the candidate suspicious website database 380.

The filter module 370 generates the filter classifier 350 based on the dataset of features associated with the known malicious and innocuous websites stored in the filter training corpus database 360. The filter classifier 350 is a statistical model which specifies values such as weights or coefficients that are associated with features used to distinguish malicious websites from innocuous websites. Suitable types of statistical models for use as a filter classifier 350 include but are not limited to: neural networks, Bayesian models, regression-based models and support vectors machines (SVMs). According to the embodiment, the filter module 370 may generate the filter classifier 350 on a periodic basis or whenever updates or changes are made to the filter training corpus database 360. The filter module 370 then stores the generated filter classifier 250.

The filter module 370 applies the filter classifier 350 to data stored in the candidate suspicious website database 380 to generate filter scores for candidate suspicious websites. The filter module 370 determines whether the candidate suspicious websites require further analyses (i.e. are suspicious websites) based on the filter scores. The filter score indicates the correspondence between the features extracted from a candidate suspicious website and the features extracted from the known malicious websites represented by the filter classifier 350.

In one embodiment, the filter score is a binary score indicating whether or not the features extracted from the candidate suspicious website have a higher similarity to features extracted from innocuous websites or features extracted from malicious websites. In most embodiments, the filter score is a continuous score indicating the similarity between the features extracted from a candidate suspicious website and the features extracted from the known malicious websites. In embodiments where the filter score is a continuous score, the filter module 370 may compare the filter score to a threshold value to determine whether the candidate suspicious website is a suspicious website. The filter module 370 transmits the identified suspicious websites and associated filter scores to the scanning engine 130 for further analyses.

Figure 4:
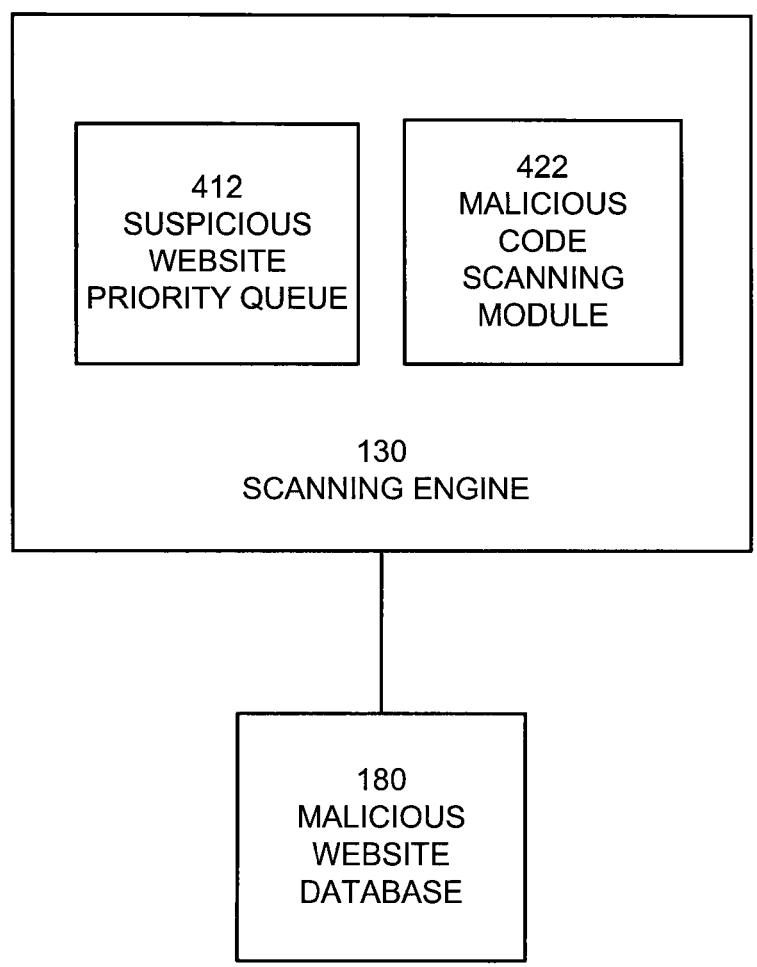
FIG. 4 is a high-level block diagram illustrating a detailed view of the scanning engine 130 according to one embodiment.

FIG. 4 is a high-level block diagram illustrating a detailed view of the scanning engine 130 (FIG. 1) according to one embodiment. As shown in FIG. 4, the scanning engine 130 includes multiple modules. Those of skill in the art will recognize that other embodiments of the scanning engine 130 can have different and/or other modules than the ones described here, and that the functionalities can be distributed among the modules in a different manner.

The suspicious website priority queue 412 communicates with the malicious code scanning module 422 to prioritize the analysis of suspicious websites identified by the filter engine 120 (FIG. 1). The suspicious website priority queue 412 receives unique identifiers and filter scores for the suspicious websites from the filter module 120. The suspicious website priority queue 412 stores the unique identifiers for the suspicious websites in an order based on their filter score and/or the time they are received from the filter engine 120. In embodiments where a continuous filter score representing a similarity to a malicious website is generated, the unique identifiers for the suspicious websites are ordered in the suspicious website priority queue 412 according to their similarity to the malicious websites. In this order, priority for analysis by the malicious code scanning module 422 corresponds to the continuous filter score indicating the suspicious websites' similarity to malicious websites. In embodiments where a binary filter score is generated, the unique identifiers for the suspicious websites are stored in the suspicious website priority queue 412 in the order they are received from the filter engine 120.

The suspicious website priority queue 412 communicates with the malicious code scanning module 422 to transmit the unique identifier for the suspicious website having the highest priority for analysis to the malicious code scanning module 422. Upon transmission to the malicious code scanning module 422, the unique identifier is removed from the suspicious website priority queue 412 and the suspicious website priority queue 412 is updated accordingly.

The malicious code scanning module 422 analyzes the suspicious websites to generate suspicious websites scores indicating whether the suspicious websites are malicious websites. The malicious code scanning module 422 communicates with a computing system to access the suspicious websites using the computing system. In most embodiments, the malicious code scanning module 422 accesses the suspicious website using a computing system in a quarantined environment. According to the embodiment, the computer system may be a separate or same computing system as the security server 110 (FIG. 1). According to the embodiment, the malicious code scanning module 422 may employ processes for accessing the suspicious website in order to obfuscate the mechanism by the suspicious website is accessed, such as masking the IP address so that it cannot be traced to the security server 110.

Once the malicious website is accessed, the malicious code scanning module 422 monitors the computing system used to access the suspicious website to determine whether the website is trying to exploit known vulnerabilities associated with software commonly used by computing systems to access websites such as internet browser software. The malicious code scanning module 422 further monitors the computing system to determine if the access of the suspicious website results in software being downloaded onto the computing system.

If accessing the suspicious website causes software to be downloaded to the computing system, the malicious code scanning module 422 can further determine whether the downloaded software is malicious software (i.e. the suspicious websites are malicious websites) using behavior-based techniques, characteristic-based techniques or any combination thereof.

In some embodiments, the malicious code scanning module 422 uses behavior-based techniques to determine whether the software is malicious software. In these embodiments, the malicious code scanning module 422 either emulates or executes the downloaded software on the computing system. The malicious code scanning module 422 may emulate the downloaded software by breaking the downloaded software's byte code into commands, and then launching each command in a virtual environment or a tightly controlled "sandbox" environment. This allows the observation of the downloaded software's behavior without any threat being posed to the computer system.

Based on the emulation or execution of the malicious software, the malicious code scanning module 422 identifies commands and actions performed by the downloaded software. Commands and actions performed by the downloaded software that can indicate malicious software include but are not limited to: modifications to the registry of the computing system, writing to the file system of the computer system, attempts to modify system components of the computer system (e.g. attempts to modify the HOSTS file of the computer system), modifications to the user settings of the computer system (e.g. modifications to the home page of the browser), attempts to modify software executed at start-up of the computer system and attempts to kill any currently executed software on the computer system (e.g. attempts to kill anti-virus software).

In some embodiments, the malicious code scanning module 422 uses characteristic-based techniques to determine whether the downloaded software is malicious software. In these embodiments, the malicious code scanning module 422 scans the downloaded software using malicious software signatures or hashes derived from known malicious software to determine whether or not the downloaded software corresponds to malware. Malicious software signatures represent characteristics that are either typically or uniquely associated with malware. Malicious software hashes are generated by applying transformative functions to known malware. According to the embodiment, the malicious code scanning module 422 may determine whether the downloaded software is malicious software based on the identification of one or more malicious software signatures or malicious software hashes in information associated with the downloaded software.

The malicious code scanning module 422 can combine data indicating whether the downloaded software is malicious software in any way to generate malicious websites scores indicating whether the suspicious websites are malicious websites. According to the embodiment, the malicious website score may be a binary score indicating whether or not the suspicious website is a malicious website or an innocuous website or a continuous score indicating a level or percentage of similarity to malicious websites. The malicious code scanning module 422 stores the malicious website score in association with the unique identifier for the malicious website in the malicious website database 180.

Figure 5:
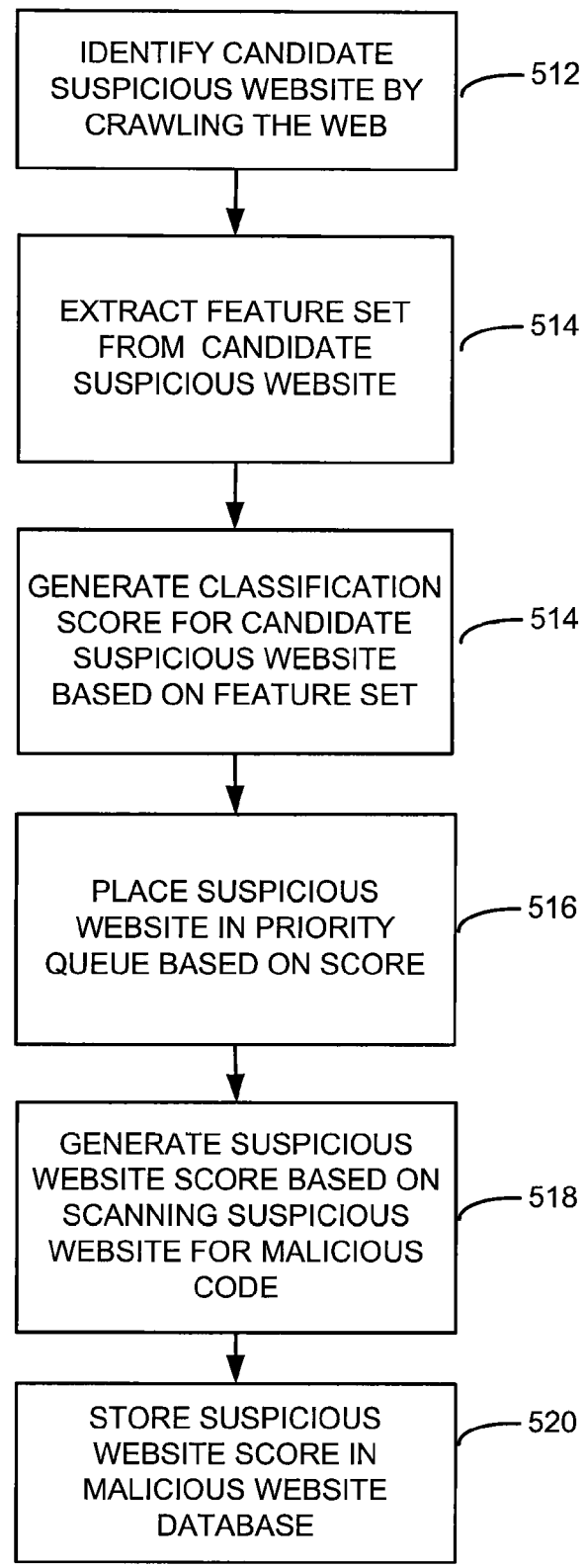
FIG. 5 is a flowchart illustrating steps performed by the security server 110 to generate a suspicious website score according to one embodiment.

FIG. 5 is a flowchart illustrating steps performed by the security server 110 (FIG. 1) to generate and store suspicious websites scores according to one embodiment. Other embodiments perform the illustrated steps in different orders, and/or perform different or additional steps. Moreover, some of the steps can be performed by engines or modules other than the security server 110.

The security server 110 identifies 512 a candidate website using defined heuristics. The security server 110 extracts 514 a feature set from the candidate suspicious website and information associated with the candidate website including HTTP traffic information. The security server 110 generates 516 a filter score for the candidate suspicious website by applying a filter classifier 350 (FIG. 3) to the feature set. If the filter score indicates that the candidate suspicious website is a suspicious website, the security server 110 stores 518 the suspicious website in the suspicious website priority queue 412. When the candidate website has the highest priority in the suspicious website priority queue, the security server 110 generates 581 a suspicious website score based on monitoring the behavior of the suspicious website when accessed by a computing device. The security server 110 stores the suspicious website score in the malicious website database 180 (FIG. 1).

Figure 6:
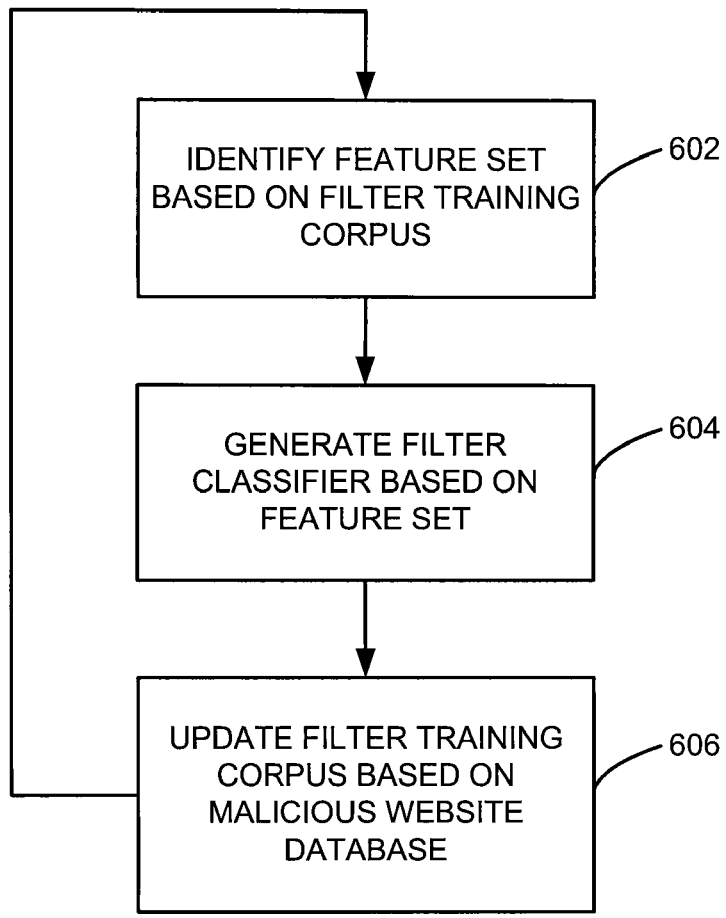
FIG. 6 is a flowchart illustrating steps performed by the security server 110 to iteratively generate a filter classifier according to one embodiment.

FIG. 6 is a flowchart illustrating steps performed by the security server 110 (FIG. 1) to iteratively generate filter classifiers 350 (FIG. 3) according to one embodiment. Other embodiments perform the illustrated steps in different orders, and/or perform different or additional steps. Moreover, some of the steps can be performed by engines or modules other than the security server 110.

The security server 110 identifies 602 a lightweight feature set including features generated based on information associated with known malicious websites and known innocuous websites based on the filter training corpus database 360. The security server 110 generates 604 a filter classifier 350 based on the identified feature set. This processed is repeated, as the security server 110 updates 606 the filter training corpus database 360 based on the malicious website database 180.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A method of identifying malicious websites, the method comprising:
   identifying a candidate suspicious website;
   identifying a plurality of lightweight features associated with the candidate suspicious website;
   identifying a dataset comprising a plurality of lightweight features associated with a plurality of known malicious websites and a plurality of lightweight features associated with a plurality of known innocuous websites;
   generating a filter classifier comprising a statistical model including weights for the plurality of lightweight features associated with the plurality of known malicious websites and the plurality of lightweight features associated with the plurality of known innocuous websites that distinguish the plurality of known malicious websites from the plurality of known innocuous websites;
   determining, with the weights of the generated filter classifier, a continuous filter score for the candidate suspicious website based on the plurality of lightweight features associated with the candidate suspicious website, the continuous filter score indicating similarity between the lightweight features associated with the candidate suspicious website and the lightweight features of the known malicious websites;
   prioritizing a scan of the candidate suspicious website relative to other candidate suspicious websites in response to the continuous filter score for the candidate suspicious website and continuous filter scores for the other candidate suspicious websites;
   determining whether the candidate suspicious website is a malicious website responsive at least in part to the scan;
   updating, in response to determining that the suspicious website is a malicious website, the plurality of lightweight features associated with the plurality of known malicious websites in the dataset to include the plurality of lightweight features associated with the suspicious website; and
   re-generating the filter classifier to update the statistical model to include at least one modified weight for the plurality of lightweight features based on the updated dataset.

2. The method of claim 1, wherein identifying a candidate suspicious website comprises:
   identifying a set of heuristics including a set of seed links; and
   identifying a link to the candidate suspicious website based on the set of seed links.

3. The method of claim 1, wherein identifying the plurality of lightweight features associated with the candidate suspicious website comprises:
   identifying hypertext transfer protocol information associated with the candidate suspicious website; and
   identifying the plurality of lightweight features associated with the candidate suspicious website based on the hypertext transfer protocol information.

4. The method of claim 1, wherein the plurality of lightweight features comprise one or more features from the set consisting of:
   web server software of the candidate suspicious website;
   whether the candidate suspicious website contains a reference to an advertising network;
   whether the candidate suspicious website contains a reference to a public file hosting system; and
   a number of redirections or links to other websites in the candidate suspicious website.

5. The method of claim 1, wherein determining whether the candidate suspicious website is a malicious website comprises:
   identifying software downloaded to the computing system responsive to accessing the candidate suspicious website; and
   determining whether the software downloaded to the computing system is malware based on characteristics associated with the downloaded software.

6. The method of claim 1, wherein generating the filter classifier based on the plurality of lightweight features associated with the plurality of known malicious websites and the plurality of known innocuous websites in the dataset comprises:
   storing information associated with the plurality of known malicious websites and the plurality of known innocuous websites in association with unique identifiers for the websites, the information including lightweight features extracted from each of the plurality of known innocuous and the plurality of known malicious websites.

7. A computer system for identifying malicious websites, the system comprising:
   a non-transitory computer-readable storage medium storing executable computer program instructions comprising:
      a web crawler module adapted to:
         identify a candidate suspicious website; and identify a plurality of lightweight features associated with the candidate suspicious website;
a filter module adapted to:
identify a dataset comprising a plurality of lightweight features associated with a plurality of known malicious websites and a plurality of lightweight features associated with a plurality of known innocuous websites;
generate a filter classifier comprising a statistical model including weights for the plurality of lightweight features associated with the plurality of known malicious websites and the plurality of lightweight features associated with the plurality of known innocuous websites that distinguish the plurality of known malicious websites from the plurality of known innocuous websites; and
determine, with the weights of the generated filter classifier, a continuous filter score for the candidate suspicious website based on the plurality of lightweight features associated with the candidate suspicious website, the continuous filter score indicating similarity between the lightweight features associated with the candidate suspicious website and the lightweight features of the known malicious websites;
a malicious website scanning module adapted to:
prioritize a scan of the candidate suspicious website relative to other candidate suspicious websites in response to the continuous filter score for the candidate suspicious website and continuous filter scores for the other candidate suspicious websites; and
determine whether the candidate suspicious website is a malicious website responsive at least in part to the scan;
wherein the filter module is further adapted to:
update, in response to determining that the suspicious website is a malicious website, the plurality of lightweight features associated with the plurality of known malicious websites in the dataset to include the plurality of lightweight features associated with the suspicious website, and
wherein the filter classifier is re-generated to update the statistical model to include at least one modified weight for the plurality of lightweight features based on the updated dataset; and
a processor for executing the computer program instructions.

8. The system of claim 7, wherein the web crawler module is further adapted to:
identify a set of heuristics including a set of seed links; and
identify a link to the candidate suspicious website based on the set of seed links.

9. The system of claim 7, wherein the web crawler module is further adapted to:
identify hypertext transfer protocol information associated with the candidate suspicious website; and
identify the plurality of lightweight features associated with the candidate suspicious website based on the hypertext transfer protocol information.

10. The system of claim 7, wherein the plurality of lightweight features comprise one or more features from the set consisting of:
web server software of the candidate suspicious website;
whether the candidate suspicious website contains a reference to an advertising network;
whether the candidate suspicious website contains a reference to a public file hosting system; and
a number of redirections or links to other websites in the candidate suspicious website.

11. The system of claim 7, wherein the malicious website scanning module is further adapted to:
identify software downloaded to the computing system responsive to accessing the candidate suspicious website; and
determine whether the software downloaded to the computing system is malware based on characteristics associated with the downloaded software.

12. The system of claim 7, wherein generating the filter classifier based on the plurality of lightweight features associated with the plurality of known malicious websites and the plurality of known innocuous websites in the dataset comprises:
storing information associated with the plurality of known malicious websites and the plurality of known innocuous websites in association with unique identifiers for the websites, the information including lightweight features extracted from each of the plurality of known innocuous and the plurality of known malicious websites.

13. A non-transitory computer-readable storage medium encoded with executable program code for identifying malicious websites, the program code comprising program code for:
identifying a candidate suspicious website;
identifying a plurality of lightweight features associated with the candidate suspicious website;
identifying a dataset comprising a plurality of lightweight features associated with a plurality of known malicious websites and a plurality of lightweight features associated with a plurality of known innocuous websites;
generating a filter classifier comprising a statistical model including weights for the plurality of lightweight features associated with the plurality of known malicious websites and the plurality of lightweight features associated with the plurality of known innocuous websites that distinguish the plurality of known malicious websites from the plurality of known innocuous websites;
determining, with the weights of the generated filter classifier, a continuous filter score for the candidate suspicious website based on the plurality of lightweight features associated with the candidate suspicious website, the continuous filter score indicating similarity between the lightweight features associated with the candidate suspicious website and the lightweight features of the known malicious websites;
prioritizing a scan of the candidate suspicious website relative to other candidate suspicious websites in response to the continuous filter score for the candidate suspicious website and continuous filter scores for the other candidate suspicious websites;
determining whether the candidate suspicious website is a malicious website responsive at least in part to the scan;
updating, in response to determining that the suspicious website is a malicious website, the plurality of lightweight features associated with the plurality of known malicious websites in the dataset to include the plurality of lightweight features associated with the suspicious website; and
re-generating the filter classifier to update the statistical model to include at least one modified weight for the plurality of lightweight features based on the updated dataset.

14. The storage medium of claim 13, wherein program code for identifying the plurality of lightweight features associated with the candidate suspicious website comprises program code for:
- identifying hypertext transfer protocol information associated with the candidate suspicious website; and
- identifying the plurality of lightweight features associated with the candidate suspicious website based on the hypertext transfer protocol information.

15. The storage medium of claim 13, wherein generating the filter classifier based on the plurality of lightweight features associated with the plurality of known malicious websites and the plurality of known innocuous websites in the dataset comprises:
- storing information associated with the plurality of known malicious websites and the plurality of known innocuous websites in association with unique identifiers for the websites, the information including lightweight features extracted from each of the plurality of known innocuous and the plurality of known malicious websites.

16. The storage medium of claim 13, wherein the plurality of lightweight features comprise one or more features from the set consisting of:
- web server software of the candidate suspicious website;
- whether the candidate suspicious website contains a reference to an advertising network;
- whether the candidate suspicious website contains a reference to a public file hosting system; and
- a number of redirections or links to other websites in the candidate suspicious website.

* * * * *